US005636917A

United States Patent [19]

Furami et al.

[11] Patent Number: 5,636,917

[45] Date of Patent: Jun. 10, 1997

[54] PROJECTOR TYPE HEAD LIGHT

[75] Inventors: Takashi Furami, Kawasaki; Hitoshi Taniuchi, Ohta-ku, both of Japan

[73] Assignee: Stanley Electric Co., Ltd., Tokyo, Japan

[21] Appl. No.: 452,951

[22] Filed: May 30, 1995

[30] Foreign Application Priority Data

May 31, 1994 [JP] Japan .................................... 6-139677

[51] Int. Cl.$^{6}$ ................................ B60Q 1/04; F21V 7/04

[52] U.S. Cl. ............................ 362/61; 362/297; 362/346

[58] Field of Search ............................. 362/61, 346, 297

[56] References Cited

U.S. PATENT DOCUMENTS

| | | | |
|---|---|---|---|
| 4,803,601 | 2/1989 | Collot et al. | 362/346 |
| 4,814,950 | 3/1989 | Nakata | 362/346 |
| 4,825,343 | 4/1989 | Nakata | 362/61 |
| 4,851,968 | 7/1989 | Nino | 362/61 |
| 4,922,389 | 5/1990 | Nino | 362/61 |
| 4,943,894 | 7/1990 | Nakata | 362/61 |

*Primary Examiner*—Leonard Heyman
*Attorney, Agent, or Firm*—Weingarten, Schurgin, Gagnebin & Hayes LLP

[57] ABSTRACT

The drawback of conventional projector type head lights of lighting excessively the immediate front of the automobile is dissolved by an improved projector type head light according to the invention. Since a projector type head light according to the invention comprises an elliptic reflector which is divided into upper and lower halves and the upper reflecting surface is defined to be found within an orthogonal projection area that allows irradiation of the orthogonal front such that reflected rays of light from the lateral sections of said upper reflecting surface are converged to the center of the light distribution pattern and those from the remaining sections are dispersed laterally, the light distribution pattern has a low profile central area while the overall contour of the light distribution pattern shows a high profile and a substantially even intensity of light over the entire area so that the orthogonal immediate front of the projector type head light is not particularly intensely lighted and the curbs and the sidewalks can be lighted with a sufficient intensity of light to remarkably improve the performance of projector type head light.

6 Claims, 7 Drawing Sheets

PROJECTOR TYPE HEAD LIGHT

BACKGROUND OF THE INVENTION

1. Field of the Invention

This invention relates to a projector type head light of an automobile and, more particularly, it relates to an improvement to a head light comprising a converging reflector and a shade for defining the light distribution pattern within the head light as well as an aspherical projection lens for projecting light with the pattern along the axis of irradiation.

2. Background Art

FIG. 10 of the accompanying drawings schematically illustrates the arrangement of a conventional projector type head light. The projector type head light 90 comprises a light source 91 which is a halogen lamp, an elliptic reflector 92 having its first focal point located substantially on the light source 91, a shade 93 arranged near the second focal point of said elliptic reflector 92 and an aspherical projection lens 94 having its focal point located close to the second focal point of said elliptic reflector 92.

The elliptic reflector 92 is divided into a central section 92*a*, left and right lateral peripheral sections 92*b*, 92*b* and upper and lower peripheral sections 92*c*, 92*c* as shown in FIG. 11 in order to make it meet the requirement of having a wide horizontal angle of projection, said central section 92*a* having its second focal point f92*a* located near the focal point f94 of the projection lens 94 and on the optical axis of the optical system of the head light in order to irradiate the orthogonal front of the projector type head light 90.

Meanwhile, the lateral peripheral sections 92*b*, 92*b* have their second focal points f92*b*, f92*b* located at respective lateral positions that are significantly offset toward left and right on a horizontal plane from the focal point f94 of the projection lens 94 so that rays of light may be irradiated with a wide angle of projection. Of rays of light entering the projection lens 94 from said elliptic reflector 92, those that are not necessary for producing an intended light distribution pattern are blocked by the shade 93 and hence removed from the optical system.

By examining the relationship between the nature of rays of light reflected by the different sections of said elliptic reflector 92 and the light distribution pattern of the projector type head light, it will be found that, since an axially long filament called C-filament is normally used for the light source 91 of the projector type head light 90 of the type under consideration, an image of the filament is projected vertically by rays of light reflected from the central section 92*a* and the lateral peripheral sections 92*c*, 92*c* of the elliptic reflector 92 to show a vertically long but laterally narrow image, whereas the image of the filament projected horizontally by rays of light reflected from the lateral peripheral sections 92*b*, 92*b* tends to be vertically short and laterally wide.

Thus, rays of light from the relatively high central section 92*a* and upper and lower peripheral sections 92*c*, 92*c* of the elliptic reflector 92 are arranged in left and right lateral areas of the light distribution pattern close that are to the center, whereas those from the relatively low left and right lateral peripheral sections 92*b*, 92*b* of the elliptic reflector 92 are spread to the left and right so that the light distribution pattern HO becomes lowly profiled and substantially T-shaped as shown in FIG. 13 when upward beams are removed by the shade 93.

Such a T-shaped light distribution pattern HO of a conventional projector type head light 90 has a number of disadvantages. Firstly, the road lying ahead of the running automobile is particularly brightly lighted in an area immediately in front of it to reduce the visual sensitivity of the driver and therefore the lighting effect of the head light so that an auxiliary shade will have to be provided on the head light in order to lessen the brightness of that area, making the configuration of the head light rather complicated and reducing the overall quantity of light available for lighting.

Secondly, rays of light of the low profile light distribution pattern are further dispersed laterally to shed light sideways so that the curbs and the sidewalks are lighted only with such a low profile light distribution pattern to make the traffic signs hardly visible to the driver if they are arranged at high positions. These and other problems of conventional projector type head lights are to be dissolved to ensure reliable lighting on the part of automobiles.

From the above description, it may appear that the above problems are solved by confining rays of light coming from the lower lateral peripheral sections 92*b*, 92*b* to a central area of the light distribution pattern and laterally spreading the rays of light coming from the relatively high central section 92 and the lower lateral peripheral sections 92*c*, 92*c*. However, the size of the area of orthogonal projection C that allows projection of light orthogonally in front of the light distribution pattern 92 is limited for the reasons that will be described hereinafter by referring to FIG. 2(A) and rays of light coming from the left and right lateral sections 92*b*, 92*b* are excluded from this area of orthogonal projection C to make such an attempt not feasible.

SUMMARY OF THE INVENTION

According to the invention, the above problems and other problems of conventional projector type head lights are solved by providing a projector type head light comprising a light source, an elliptic reflector having its first focal point located substantially on the light source, a projection lens having its focal point located near the second focal point of said elliptic reflector and a shade located near the focal point of the projection lens, characterized in that said projection lens is required to draw a focal curve representing the locus of movement of the focal point of the projection lens corresponding to the horizontal deviation angle and an area of orthogonal projection enabling the projection lens to irradiate rays of light in an orthogonally frontal direction, that the surface of said elliptic reflector is divided into an upper reflecting surface and a lower reflecting surface by an imaginary horizontal plane including the optical axis of the reflector, said elliptic reflector showing a cross sectional view of part of an ellipse if taken along a vertical plane including said optical axis, that said upper reflecting surface is formed within said orthogonal projection area and further divided into a central section and left and right lateral sections and said central section is constituted by two or more than two areas, each being adapted for angularly moving continuously and gradually the second focal point from 30°±20° to 0°±10° along the focal curve on the related lateral side as it moves laterally away from the center on that side, that said lateral sections are adapted for positioning the second focal point on a center of said focal curve, and that said lower reflecting surface is divided into one or more than one areas and adapted for angularly moving continuously and gradually the second focal point from 30°±20° of either lateral side to 30°±20° of the other lateral side on said focal curve as it moves from said either lateral side to said other lateral side.

DETAILED DESCRIPTION OF THE PREFERRED EMBODIMENTS

Figure 1:
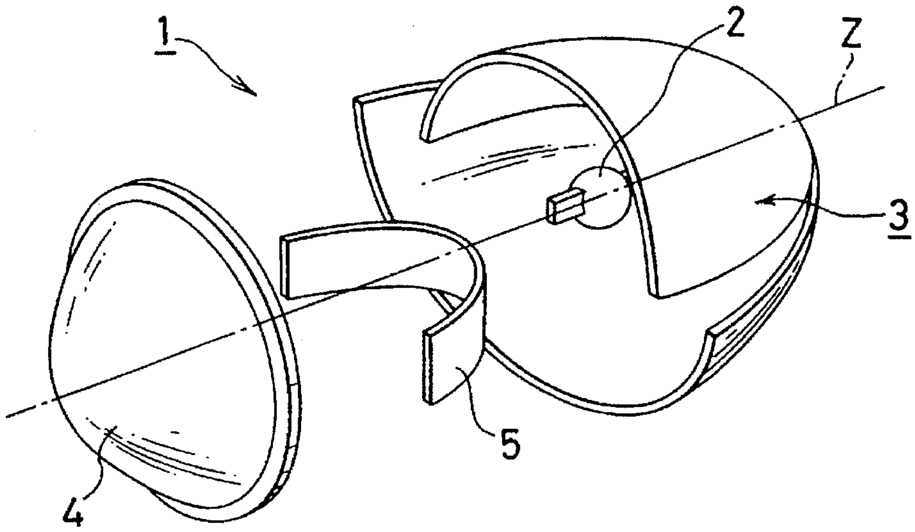
FIG. 1 is an exploded perspective view of an embodiment of projector type head light according to the invention.

Now, the present invention will be described by way of an embodiment. Referring to FIG. 1, reference numeral 1 denotes an embodiment of projector type head light according to the invention that comprises, as in the case of a comparable conventional projector type head light, a light source which may be a halogen lamp with or without infrared reflection film or a metal halide discharge lamp, an elliptic reflector 3 having its first focal point located on said light source 2, a projection lens 4 having its focal point near the second focal point of the elliptic reflector 3 and a shade 5 arranged near the focal point of the projection lens 4. For the ease of understanding, the elliptic reflector is shown in a simplified manner in FIG. 1, while it is illustrated in greater detail in FIGS. 3 and 4.

Figure 2:
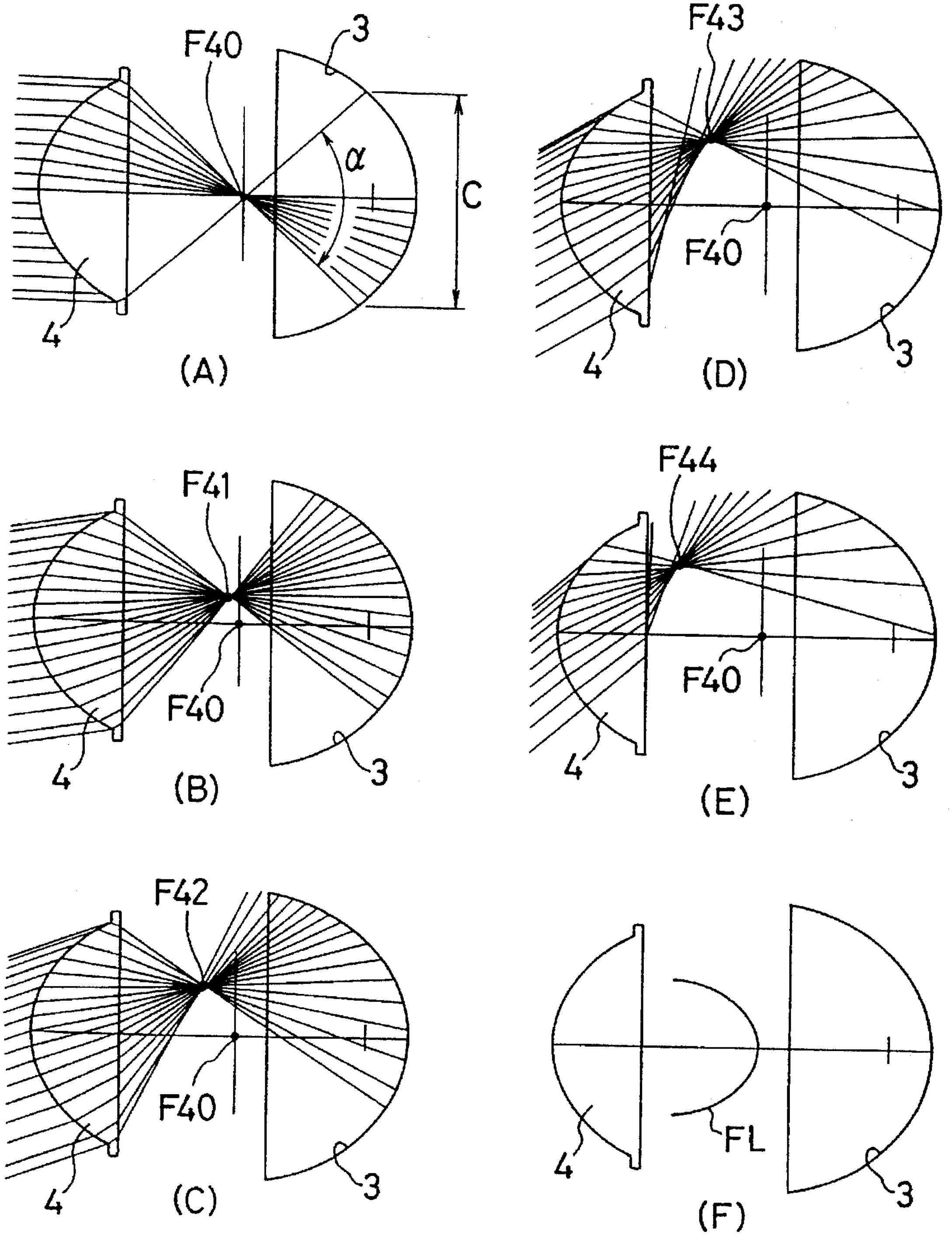
FIGS. 2A through 2F schematically illustrate a procedure to define a focal curve and the orthogonal projection area of the embodiment of FIG. 1.

For the purpose of the invention, a focal curve FL representing the locus of movement of the focal point of the projection lens corresponding to the horizontal deviation angle and an orthogonal projection area C of the projection lens 4 are defined in advance by following the procedure illustrated in FIGS. 2A–F. With the procedure, firstly it is assumed that parallel rays of light enters the projection lens 4 from the horizontal and orthogonal front of the lens or with a horizontal argument of 0° as shown in FIG. 2A.

When the horizontal argument is 0°, the incident light of the projection lens 4 is focused to the focal point F40 of the projection lens 4 and thereafter disperses with an angle of dispersion of a toward the elliptic reflector 3. Under this condition, all the rays of light within the dispersion angle a passes through the projection lens 4 with a horizontal argument of 0°. Conversely, if viewed from the side of the elliptic reflector 3, all the rays of light coming from the elliptic reflector 3 can be projected from the projection lens 4 with a horizontal argument of 0°. For the purpose of the invention, the orthogonal projection area C is defined by such rays of light.

Subsequently, 10°, 20°, 30° and 40° are used for the horizontal argument as shown in FIGS. 2B–E to determine applicable rays of light and corresponding focal points F41, F42, F43 and F44. In practice, however, it is not necessary to draw graphs as shown in FIGS. 2A–F in order to determine the focal points and computer programming may suitably be used to obtain the focal points in a more accurate way. Likewise, the increment of horizontal argument is not necessarily 10° and preferably as small as 1° if a highly defined focal curve FL is required.

Thus, a focal curve FL as shown in (F) of FIG. 2F is obtained by drawing a curve connecting the focal points F40, F41, F42, F43 and F44. The orthogonal projection area C is also obtained at this stage of operation. For the purpose of the invention, the profile of the elliptic reflector 3 is determined by referring to the focal curve FL and the orthogonal projection area C.

Figure 3:
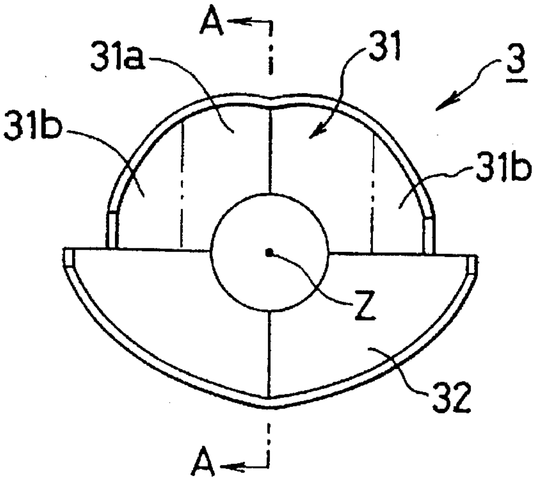
FIG. 3 is a front view of the elliptic reflector of the embodiment of FIG. 1.
Figure 4:
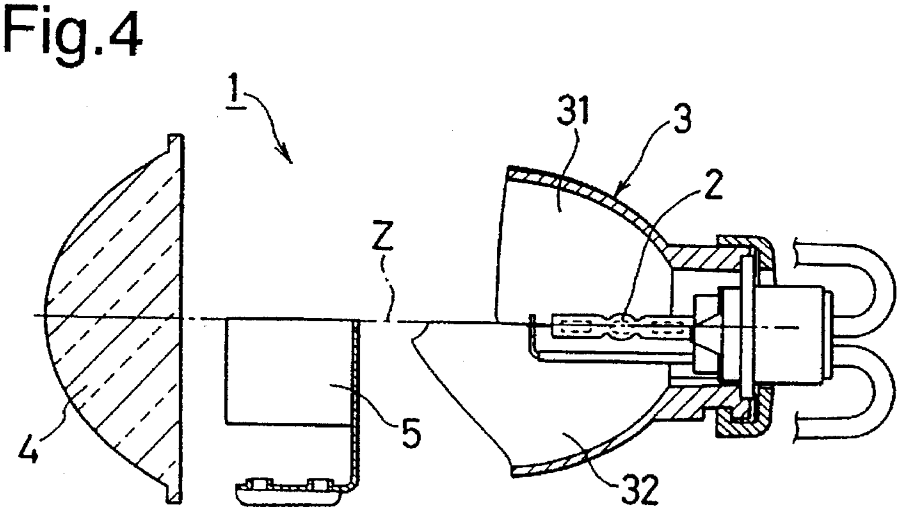
FIG. 4 is a cross sectional view of the elliptic reflector of FIG. 3 taken along line A—A.

FIGS. 3 and 4 illustrate the elliptic reflector 3 in greater detail, which is divided by an imaginary horizontal plane including the optical axis Z of the elliptic reflector 3 to produce an upper reflecting surface 31 and a lower reflecting surface 32. The elliptic reflector having an upper reflecting surface 31 and an lower reflecting surface 32 shows a cross sectional view of part of an ellipse if taken along a vertical plane including the optical axis Z as an ellipse that has its first focal point substantially agreeing with the location of the light source 2. The elliptic cross section of the reflector 3 taken along a vertical plane including the optical axis Z as shown in FIG. 4 is laterally symmetrical in this embodiment.

As seen from FIG. 4, the upper reflecting surface 31 is so configured that its entire effective reflecting surface is found within the orthogonal projection area C and divided into a central section 31*a* and lateral sections 31*b*, 31*b* by substantially vertical lines (FIG. 3). Since the view of FIG. 3 is symmetrical, only the right half of the upper and lower reflecting surfaces 31 and 34 in FIG. 3 will be described hereafter.

Figure 5:
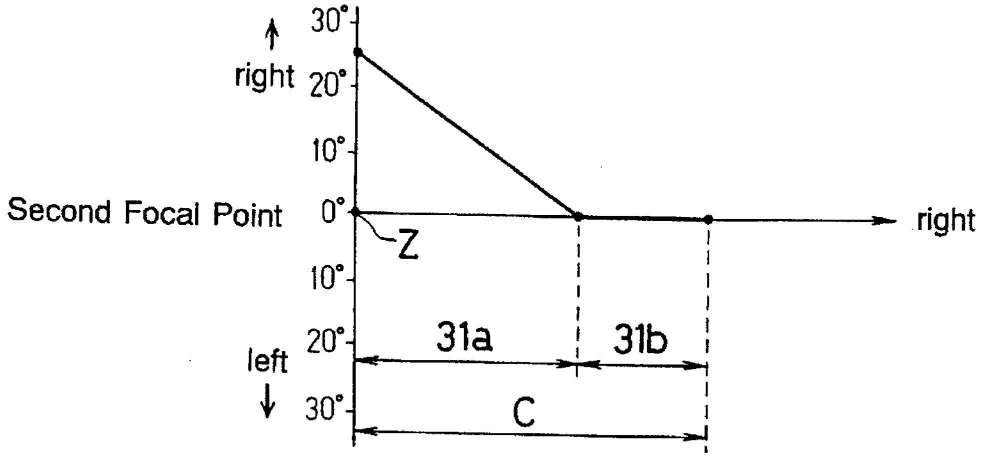
FIG. 5 is a graph showing the movement of the second focal point of the upper reflecting surface of the elliptic reflector of FIG. 3.

FIG. 5 is a graph showing how the second focal point of said upper reflecting surface 31 changes its position. At the center of the upper reflecting surface 31 or on the vertical plane including the optical axis of the central section 31*a*, the second focal point is located at a position on the focal curve FL defined by angle 25° to the right, which is gradually decreased for some time with the position on the reflecting surface until it gets to a position defined by 0° that correspond to a position on the border line separating the central section 31*a* and the neighboring lateral section 31*b* or a position that agrees with the focal point of the projection lens 4. The second focal point of the lateral section 31*b* is always located at a position on the focal curve FL defined by angle 0°.

Figure 6:
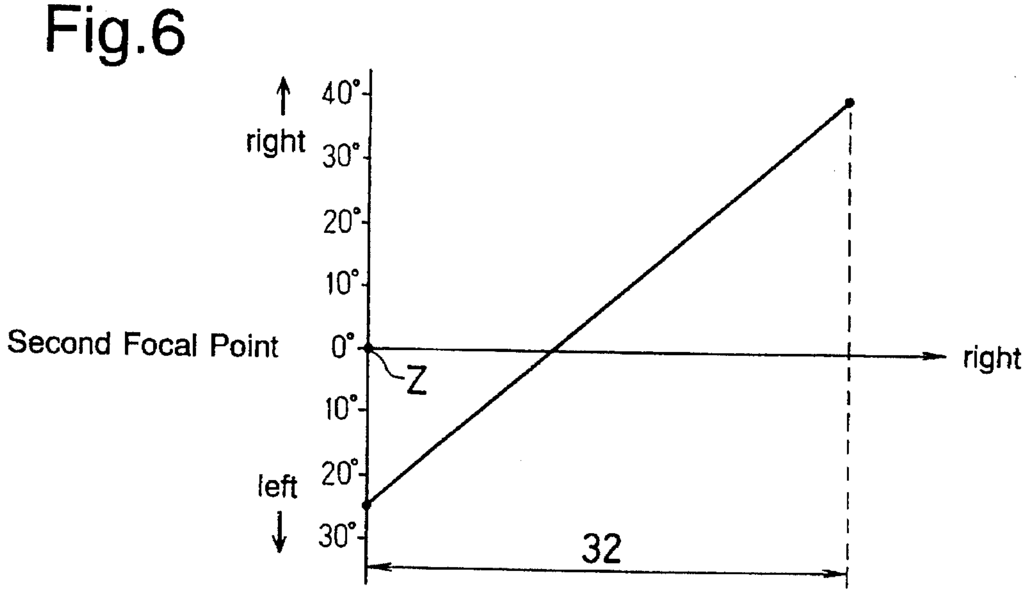
FIG. 6 is a graph showing the movement of the second focal point of the lower reflecting surface of the elliptic reflector of FIG. 3.

FIG. 6 is a graph showing how the second focal point of said lower reflecting surface 32 changes its position. At the center of the lower reflecting surface the second focal point is located at a position on the focal curve FL defined by angle 25° to the left and, at the right side end, it is located at a position on the focal curve FL defined by angle 40° to the right. In between, the focal point changes its position continuously from angle 25° to the left to angle 40° to the right.

It should be noted, however, the second focal point of the upper reflecting surface 31 and that of the lower reflecting surface 32 are not limited to the above numerical values. As a result of a series of intensive research efforts paid by the inventors of the present invention, it is found that the second focal point of the upper reflecting surface 31 can be positionally defined by numerical values from 30°±20° to 0°±10°, whereas that of the lower reflecting surface 32 can be positionally defined by numerical values from 30°±20° of either lateral side to 30°±20° of the other lateral side.

For the purpose of the invention, the shade 5 has a curved profile that substantially agrees with the focal curve FL. More specifically, if the profile does not deviate from the focal curve FL by more than 2 mm, the focal point is secured substantially over the entire edges of projection lens 4 relative to the shade 5 so that the contour of the light distribution pattern produced by the shade is made clearly visible to produce a sharp lighting effect.

Now, the projector type head light 1 according to the invention and having the above described configuration operates in a manner as described below. Firstly, since the right half of the central section 31*a* of the upper reflecting surface 31 in FIG. 3 operates to change the second focal point along the focal curve from a point defined by angle 25° to 0° to the right, rays of right reflected by the central section 31*a* irradiate an area defined by angle 25° to 0° to the right after passing through the projection lens 4. Thus, the central section 31*a* irradiate an area rays of light defined by angle 25° to the left and angle 25° to the right as a whole.

Figure 7:
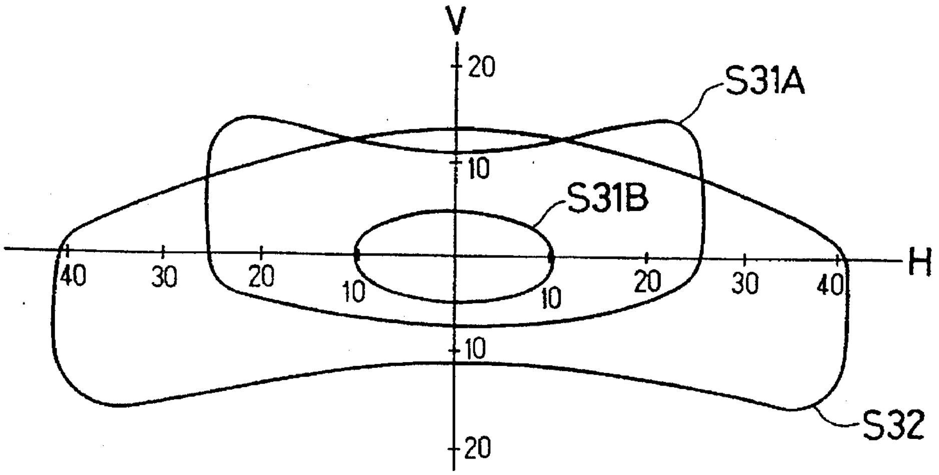
FIG. 7 is a schematic illustration of the projection patterns of light reflected from the upper and lower reflecting surfaces of the elliptic reflector of FIG. 3.

Thus, the lighting pattern produced by the central section 31*a* will have a band-shaped profile as indicated by reference symbol S31A in FIG. 7 and defined by angle 25° to the left and angle 25° to the right.

On the other hand, the two lateral sections 31*b*, 31*b* operate to make the second focal point agree with the focal point F40 of the projection lens 4 so that rays of light coming from the lateral sections 31*b*, 31*b* are not dispersed and directed to the orthogonal front (with an angle of horizontal deviation of 0°) to form a spot-like lighting pattern. Thus, the lateral sections 31*b*, 31*b* tend to produce a low profile lighting pattern, having an elliptic contour as shown in FIG. 7 and indicated by reference symbol S31B.

Meanwhile, the reflected rays of light from the right half of the lower reflecting surface 32 having a horizontal deviation angle defined by angle 25° to the left through angle 40° to the right produce a lighting pattern defined by angle 25° to the left through angle 40° to the right after passing through the projection lens 4 so that the lower reflecting surface 32 as a whole produces a horizontally oblong lighting pattern spreading from angle 40° to the right to angle 40° to the left as indicated by reference symbol S32 in FIG. 7. Since the rays of light running along a vertical plane including the optical axis Z of the optical system is subjected to a given horizontal deviation, the lighting pattern S32 of irradiated rays of light have a relatively high profile.

Figure 8:
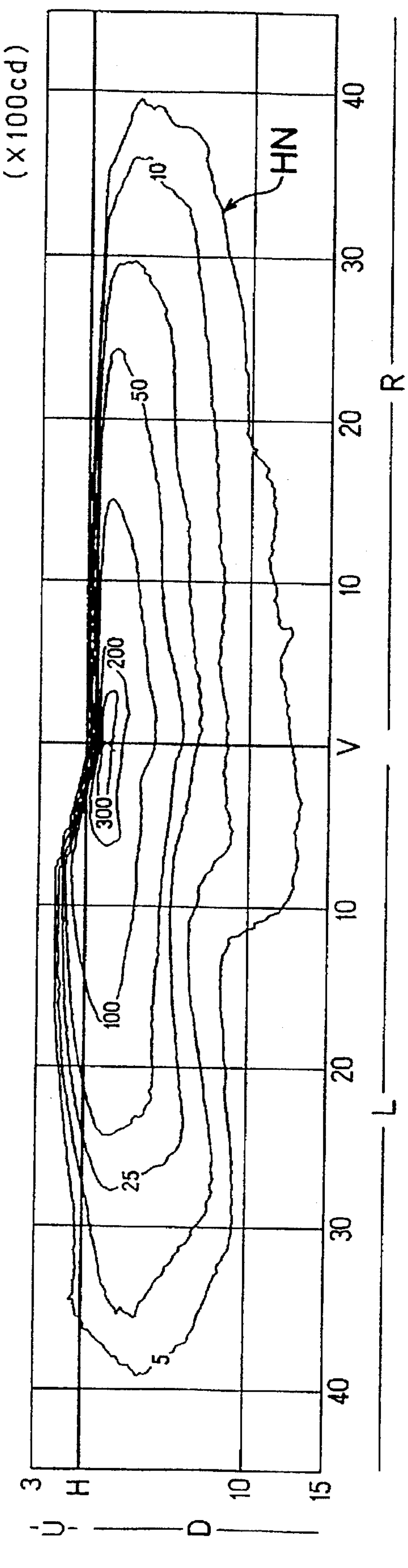
FIG. 8 is a graph showing the light distribution pattern of the embodiment of FIG. 1.

When unnecessary areas of the lighting patterns S31A, S31B and S32 are removed by the shade 5 to produce a final light distribution pattern NH of the projector type head light 1 as shown in FIG. 8. As described above, the upper reflecting surface 31 is formed within the orthogonal projection area C and the lateral sections 31*b* of the upper reflecting surface 31 for producing a low profile lighting pattern is used to irradiate the orthogonal front whereas the central section 31*a* of the upper reflecting surface 31 for producing a high profile lighting pattern and the lower reflecting surface 32 are used to produce horizontally dispersed rays of light so that the entire light distribution pattern NH has an oblong contour with a substantially even height. As a result, the head light would not excessively light the orthogonal immediate front of the automobile and, at the same time, light the lateral sides with a sufficient height.

Figure 9:
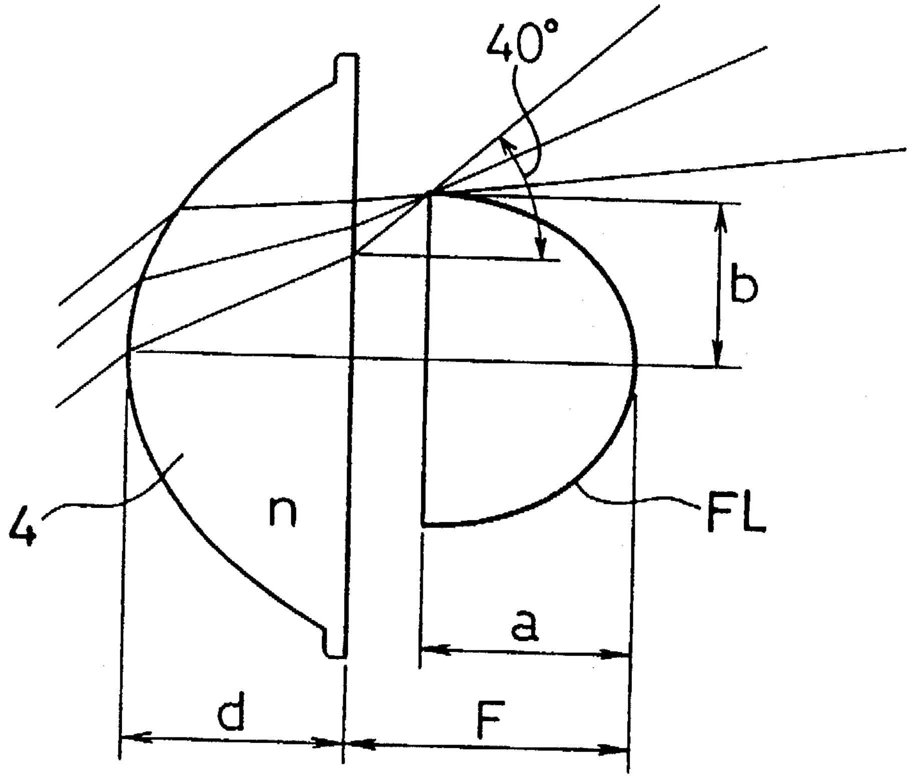
FIG. 9 is a schematic illustration showing another procedure to define a focal curve for the purpose of the invention.
Figure 10:
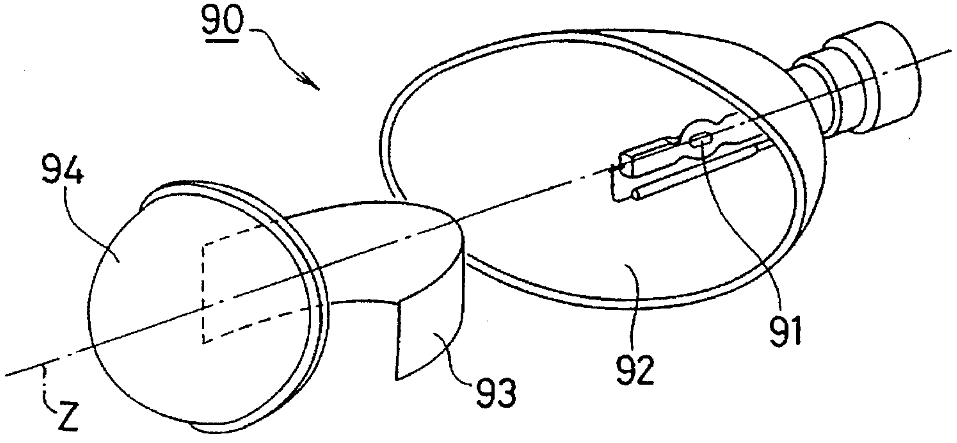
FIG. 10 is a schematic perspective view of a conventional projector type head light.
Figure 11:
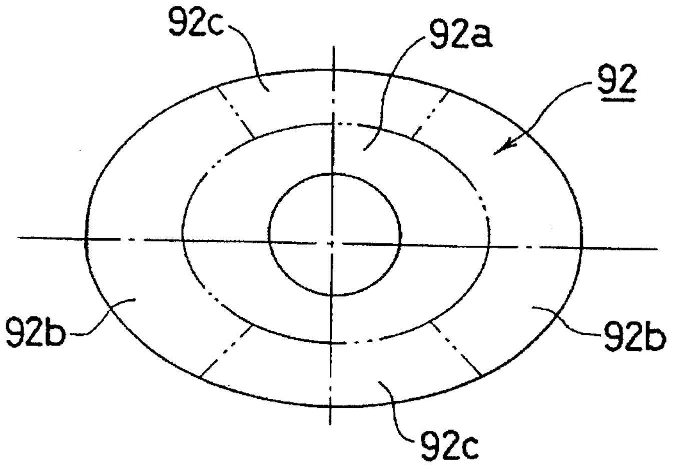
FIG. 11 is a front view of a conventional elliptic reflector.
Figure 12:
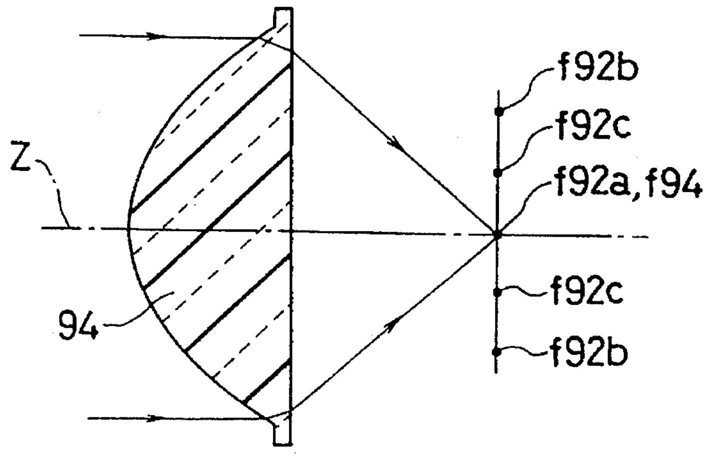
FIG. 12 is a schematic illustration of a projection patter of light reflected from the reflection surface of a conventional elliptic reflector.
Figure 13:
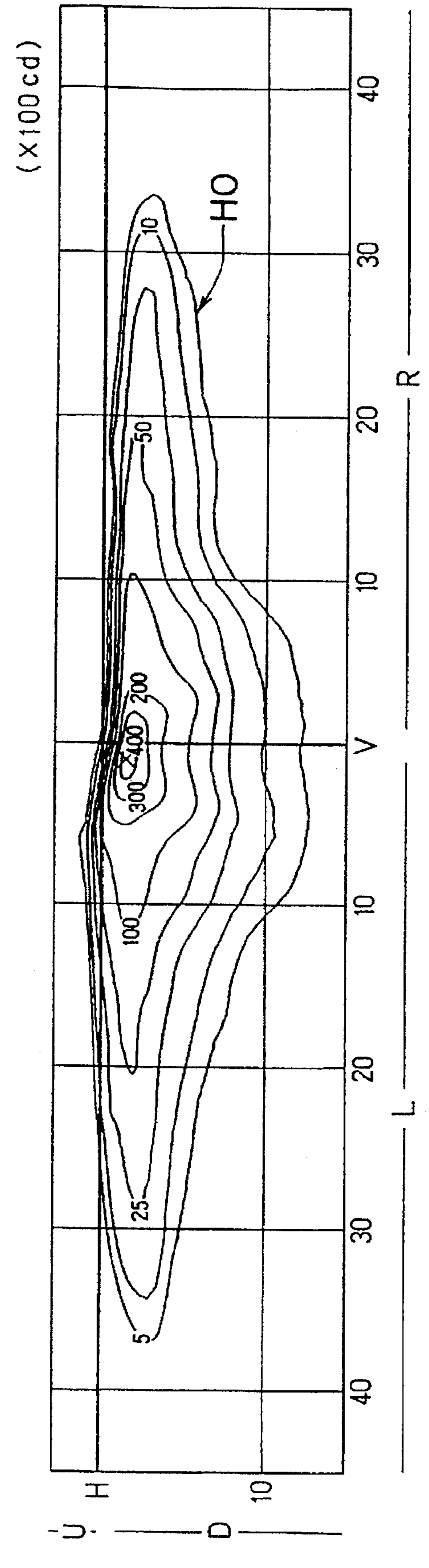
FIG. 13 is a graph showing the light distribution pattern of a conventional projector type head light.

FIG. 9 illustrates how to produce a focal curve FL. While a focal curve FL can be produced by tracing rays of light entering the projection lens 4 with a predetermined horizontal deviation angles to determine the focal point for each horizontal deviation angle and drawing a curve connecting the determined focal points as described earlier, it may be difficult to accurately locate the focal point depending on the magnitude of horizontal deviation angle if aberration and other optical factors are involved.

According to the invention, this problem is avoided if the focal curve FL is defined by the positive half of an ellipse expressed by equation $x^2/a^2+y^2/b^2=1$ having its longer axis extending both negatively and positively, where $a=F-(b-d\cdot\tan(\sin^{-1}(\sin\theta/n)))/\tan\theta$, where θ: 40, F: focal distance of the projection lens, b: a value defined by the profile of lens ($18<=b<=28d$), d: thickness of the projection lens and n: refractive index of the projection lens. With such a focal curve, the projector type head light is free from the above described problem is the optical properties of the focal point 4 can be fully exploited.

ADVANTAGES OF THE INVENTION

As described above in detail, since a projector type head light according to the invention comprises an elliptic reflector which is divided into upper and lower halves and the upper reflecting surface is defined to be found within an orthogonal projection area that allows irradiation of the orthogonal front such that reflected rays of light from the lateral sections of said upper reflecting surface are converged to the center of the light distribution pattern and those from the remaining sections are dispersed laterally, the light distribution pattern has a low profile central area while the overall contour of the light distribution pattern shows a high profile and a substantially even intensity of light over the entire area so that the orthogonal immediate front of the projector type head light is not particularly intensely lighted and the curbs and the sidewalks can be lighted with a sufficient intensity of light to remarkably improve the performance of projector type head light.

Additionally, since the orthogonal immediate front of the projector type head light is not excessively lighted, the provision of an auxiliary shade is made unnecessary to simplify the overall configuration of the projector type head light and reduce the manufacturing cost thereof. The process of determining the focal points of the projection lens as a function of horizontal deviation angle and defining a focal curve to determine the second focal points of the reflecting surfaces makes is possible to direct rays of light reflected by the reflecting surfaces in any selected directions to provide a greatly enhanced level of freedom in the design of the light distribution pattern of a projector type head light. Finally, the relationship between the focal points and the shade can be clearly defined to produce a clear contour for the light distribution pattern.

What is claimed is:

1. A projector type head light comprising:

a light source, a reflector having a first focal point located substantially on the light source, a projection lens defining a focal curve which includes a locus of points at which light converges after passing through said projection lens towards said reflector, said projection lens having an optical axis coincident with a horizontal plane dividing said reflector into an upper reflecting surface and a lower reflecting surface, wherein each point of said locus of points is defined by said light passing through said projection lens at a horizontal deviation angle measured with respect to said horizontal plane, said projection lens having an orthogonal projection area on a surface of said projection lens defined by light parallel to said optical axis passing through said projection lens and striking said reflector, said reflector having an elliptical cross section when taken along a vertical plane including said optical axis, said upper reflecting surface is formed within said orthogonal projection area and is further divided into a central section and left and right lateral sections, said central section having at least two areas, each of said at least two areas directing light to said focal curve at a point corresponding to light having a horizontal deviation angle of from 30°±20° to 0°±10° from a related lateral side and varying continuously and gradually along the focal curve therebetween said lateral sections focusing light to a point on said focal curve corresponding to a horizontal deviation angle of about 0° and, said lower reflecting surface directing light from either lateral side of said lower reflecting surface to a point on said focal curve corresponding to a horizontal deviation angle of 30°±20° on either lateral side of said focal curve and directing light from an opposite lateral side of said lower reflecting surface to a point on said focal curve corresponding to a horizontal deviation angle of 30+±20° on an opposite lateral side of said focal curve and said lower reflecting surface varying said directed light continuously and gradually to said focal curve from said either lateral side of said lower reflecting surface to said opposite lateral side; and a shade substantially coincident with said focal curve.

2. A projector type head light according to claim 1, wherein said focal curve is determined by a rays of light tracing means on the basis of the profile of the projection lens.

3. A projector type head light according to claim 1, wherein the focal curve is defined by the positive half of an ellipse expressed by equation $x^2/a^2+y^2/b^2=1$ having a longer axis extending both negatively and positively, where $a=F-(b-d\cdot\tan(\sin^{-1}(\sin\theta/n)))/\tan\theta$, where θ: 40, F: focal distance of the projection lens, b: a value defined by the profile of lens (18<=b<=28d), d: thickness of the projection lens and n: refractive index of the projection lens.

4. A projector type head light according claim 1, wherein the shade is located within 2 mm from said focal curve.

5. A projector type head light according to claim 2, wherein the shade is located within 2 mm from said focal curve.

6. A projector type head light according to claim 3, wherein the shade is located within 2 mm from said focal curve.

* * * * *

UNITED STATES PATENT AND TRADEMARK OFFICE

CERTIFICATE OF CORRECTION

PATENT NO. : 5,636,917

DATED : June 10, 1997

INVENTOR(S) : Takashi Futami, et al.

It is certified that error appears in the above-identified patent and that said Letters Patent is hereby corrected as shown below:

Column 4, line 13, "in (F) of Fig. 2F" should read --in Fig. 2F--.

Signed and Sealed this

Sixth Day of October, 1998

Attest:

Bruce Lehman

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO : 5,636,917

DATED : June 10, 1997

INVENTOR(S) : Takashi Futami and Hitoshi Taniuchi

It is certified that error appears in the above-identified patent and that said Letters Patent is hereby corrected as shown below:

On the title page, should read:

--[75] Inventors: Takashi Futami, Kawasaki; Hitoshi Taniuchi, Ohta-ku, both of Japan--

Claim 4, line 13 should read:

--Thus, a focal curve FL as shown in FIG. 2F is--

Signed and Sealed this

Sixteenth Day of November, 1999

Attest:

Q. TODD DICKINSON

Attesting Officer

*Acting Commissioner of Patents and Trademarks*